United States Patent

[11] 3,603,574

| | | | |
|---|---|---|---|
| [72] | Inventor | Dieter Lutz | |
| | | Gildersheimer Strasse 76, 872 Schweinfurt am Main, Schweinfurt am Main, Germany | |
| [21] | Appl. No. | 844,464 | |
| [22] | Filed | July 24, 1969 | |
| [45] | Patented | Sept. 7, 1971 | |
| [32] | Priority | July 30, 1968 | |
| [33] | | Germany | |
| [31] | | P 17 80 074.7 | |

[54] SHOCK ABSORBER FOR INDEPENDENT FRONT WHEEL SUSPENSION
10 Claims, 10 Drawing Figs.

[52] U.S. Cl. ........................................... 263/34, 267/8
[51] Int. Cl. ........................................... B60g 11/56
[50] Field of Search ........................................... 267/34, 8, 65

[56] References Cited
UNITED STATES PATENTS

| | | | |
|---|---|---|---|
| 3,111,201 | 11/1963 | Bliven et al. .................. | 267/8 |
| 3,171,643 | 3/1965 | Roos .......................... | 267/65 |
| 3,188,072 | 6/1965 | Wastenhagen et al. ........ | 267/65 |

*Primary Examiner*—James B. Marbert
*Attorney*—Low and Berman

ABSTRACT: In a hydropneumatic shock absorber of the piston-and-cylinder type for a front wheel of a motorcar, an annular spacer mounted on the piston rod or on the inner cylinder wall between the piston and the end wall of the cylinder through which the piston rod passes limits radial deflection of the piston rod under stresses due to steering or to travel of the sprung wheel over an obstacle.

INVENTOR
Dieter Lutz
By: Craw and Berman
AGENTS

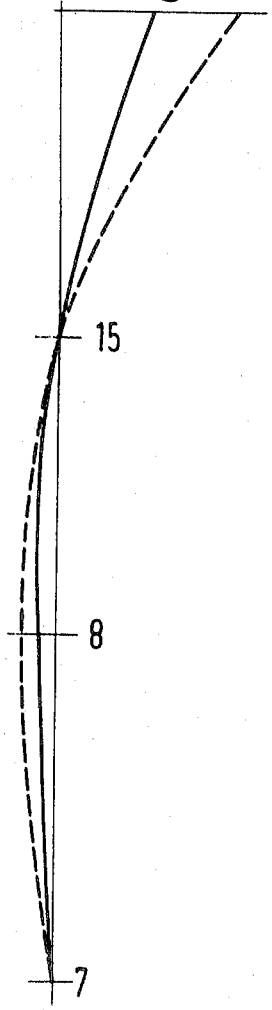
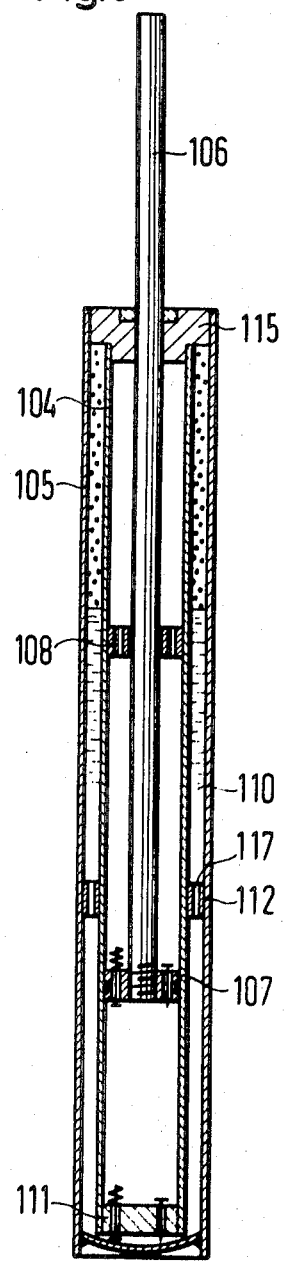

SHOCK ABSORBER FOR INDEPENDENT FRONT WHEEL SUSPENSION

This invention relates to hydropneumatic shock absorbers, and particularly to shock absorbers in independent front wheel suspension systems for automotive vehicles.

In its more specific aspects, the invention is concerned with a shock absorber in which the sprung and unsprung masses of the vehicle are attached respectively to a cylinder and to a piston rod axially projecting from the cylinder, the piston rod being fastened to a piston axially movable in the cylinder cavity. When a shock absorber of the type described is used in an independent front wheel suspension system, the piston rod is subjected to flexural stresses in normal service and yields to the stresses by ending. To prevent jamming of the bent piston rod in the end wall of the cylinder through which the rod passes, clearance must be provided about the moving rod which tends to interfere with precise steering.

In an effort to reduce the necessary dimensions of the clearance, the thickness of the cylinder end wall has been reduced, thereby avoiding jamming of the piston rod, but making it more difficult to seal the cylinder cavity. Moreover, when the length of the guiding bore for the piston rod in the cylinder end wall is reduced, the forces acting on the piston rod transversely to the cylinder axis are transmitted to the piston to such an extent that wear of the piston is accelerated, and the useful life of the shock absorber is reduced.

The primary object of the invention is the provision of a shock absorber of simple construction which is capable of reliable and extended service under conditions in which the piston rod is subjected to transverse stresses as in the suspension system for an independently spring front wheel of an automotive vehicle.

With this object and others in view, as will hereinafter become apparent, the invention, in one of its aspects, resides in a shock absorber of the type described in which radial deflection of the piston rod in the cylinder cavity is limited by a spacer fixedly fastened to one of the two principal elements of the shock absorber, that is, to the cylinder or to the piston rod, and having a face radially opposite the other element at a distance which is but a small fraction of the radial dimension of the piston rod, and typically a fraction of a millimeter.

Other features and many of the attendant advantages of this invention will readily become apparent from the following detailed description of preferred embodiments when considered in connection with the appended drawing in which:

FIG. 1 shows a front wheel suspension arrangement including a shock absorber of the invention in front elevation, and partly in section on the shock absorber axis;

FIG. 2 diagrammatically illustrates the deviation of a piston rod from a precisely axial position under transverse stresses in a suspension arrangement of the type shown in FIG. 1;

FIG. 3 shows a modification of the apparatus of FIG. 1 in a corresponding, but fragmentary view;

Figure 1:
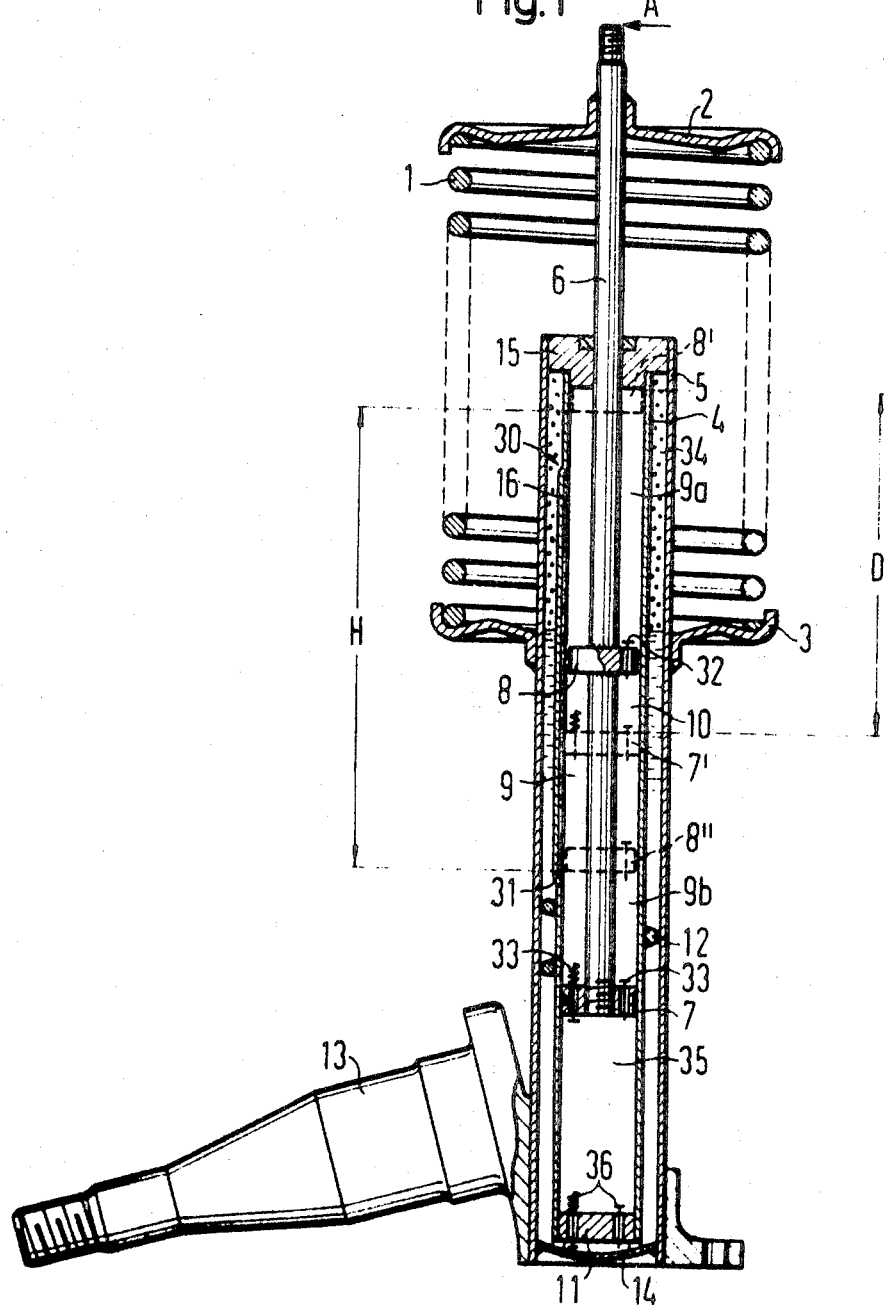
Figure 7:
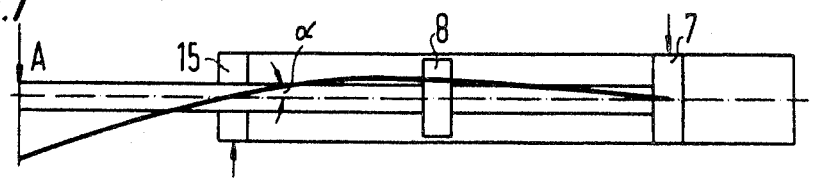
Figure 8:
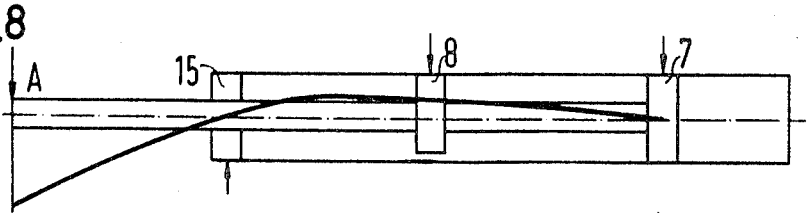
Figure 9:
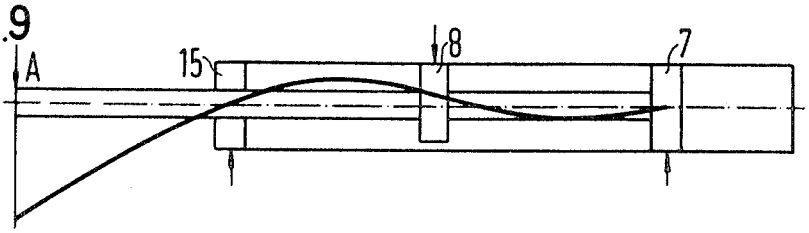
Figure 10:
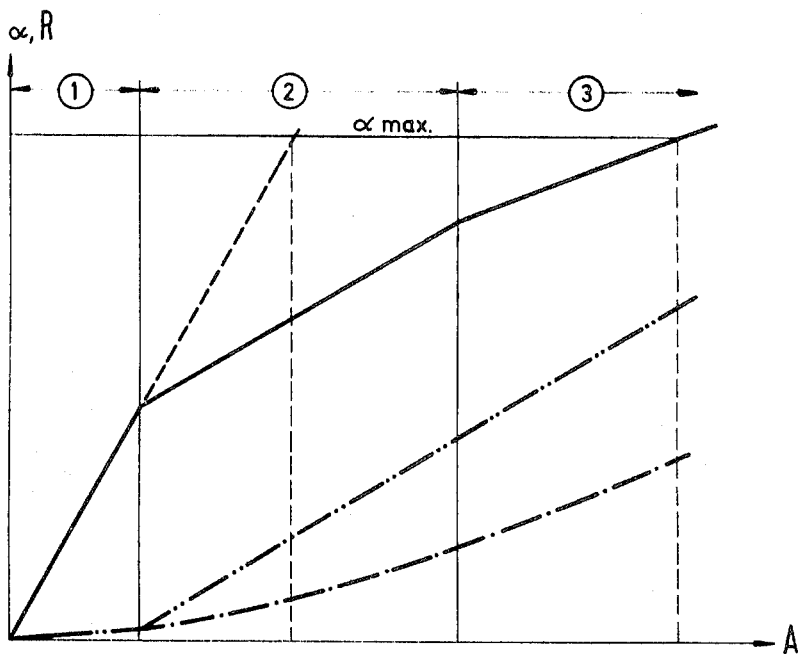

FIGS. 7 to 9 are fragmentary, diagrammatic views of the apparatus of FIG. 1 illustrating the deflection of the piston rod axis under increasing radial stresses; and FIG. 10 graphically illustrates in arbitrary units the angle between the piston rod axis and the cylinder axis at the cylinder end wall as a function of radial stress applied to the rod, and the frictional force impeding axial movement of the cylinder rod as a function of said radial stress.

Referring now to the drawing in detail, and initially to FIG. 1, there is seen as much of an independent suspension system for a steered front wheel of a motor car as is necessary for an understanding of the invention. A helical chassis spring 1 is mounted between two annular spring seats 2, 3 respectively fixed to an outer, tubular shell 5 which spacedly envelops a cylinder 4, and to a piston rod 6. The helix of the spring 1, which is normally stressed in compression, is centered in the common axis of the cylinder 4 and of the shell 5.

The piston rod 6 projects from the cylinder 4 and shell 5 in an upward axial direction. Its free top end is normally attached to the car frame (not shown). Its bottom end in the cavity of the cylinder 4 is fixedly attached to a piston 7. Above the piston, the rod 6 carries an annular spacer disc 8. The disc 8 axially divides the chamber 9 of the cylinder cavity above the piston 7 into two compartments 9a, 9b.

The shell 5 and the cylinder 4 radially bound an annular compensating chamber 10 which extends in a downward axial direction beyond the lower end wall 11 of the cylinder 4 to an imperforate transverse bottom 14 which downwardly seals the shell 5. The shell 5 is stiffened by the spring seat 3 mounted on the shell at about two-thirds of its axial height and by a helical spring 12 in the chamber 10 which has less than two turns coiled about the cylinder 4 at about one-third of the shell height, and is dimensioned for simultaneous, abutting, pressure-transmitting engagement with the spacedly opposite walls of the cylinder 4 and of the shell 5.

A steering knuckle 13, whose axis is obliquely transverse to the common axis of the shell 5 and the cylinder 4, is welded to the shell 5 near the bottom of the same and serves as a shaft for the nonillustrated front wheel. The compartment 9a and the compensating chamber 10 are upwardly closed by an annular plug or end wall 15 in which the piston rod 6 is slidably received in sealing engagement as is conventional.

Axial throttling passages in the disc 8, the piston 7, and the end wall 11 are provided with one-way valves 32, 33, 36 which are arranged in a known manner.

Abutment of the valves 32 and of other elements associated with the disc 8 against the end wall 15, and abutment of the valves 33 against the end wall 11 limit the stroke H of the piston rod 6 and of the elements mounted thereon to the axially terminal positions of the disc 8 shown in broken lines at 8', 8'', and to corresponding terminal positions of the piston 7, only the upper terminal position being shown at 7'. The axial spacing D of the piston 7 from the disc 8 is constant and is chosen in such a manner that the disc 8 axially bisects the chamber 9 when the piston 7 is approximately at the midpoint of its stroke, as shown in FIG. 1.

A straight groove 16 in the inner wall of the cylinder 4 extends axially from a point 30 spacedly adjacent the end wall 15 to a point 31 only slightly below the lower terminal position 8'' of the disc 8.

Except for a cushion of highly compressed gas 34 in the chamber 10 adjacent the end wall 15, the chamber 10 and the cavity of the cylinder 4 are filled with a liquid 35.

Figure 4:
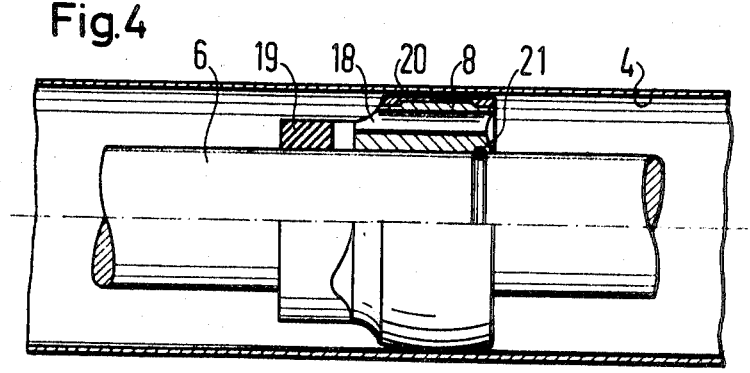
FIG. 4 shows a portion of the apparatus of FIG. 1, partly in axial section, on a larger scale.
Figure 5:
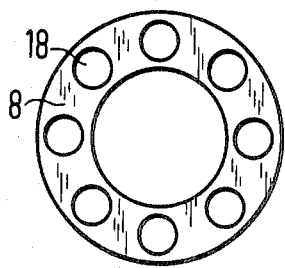
FIG. 5 is a plan view of an element in the device of FIG. 4.

As is seen in more detail in FIGS. 4 and 5, the disc 8 has eight throttling bores or passages 18 equiangularly distributed about a portion of the disc 8 which radially projects beyond an annular buffer 19 of resilient, oil-resistant material mounted on the disc 8 for softening the impact of the disc 8 on the upper end wall 15. The one-way valves provided in some or all of the passages 18 have been omitted from FIG. 4 for the sake of simplicity.

The circumferential, axial face 30 of the disc 8 has a diameter slightly smaller than the inner diameter of the cylinder wall 4, and the spacing of the face 20 from the cylinder 4 in the illustrated unstressed condition of the piston rod 6 is only 0.1 to 0.3 mm. As shown in FIG. 4, the face 30 may be partly or entirely convex in axial section. The disc 8 is axially fixed on the piston rod 6 by a ring 21 of round wire partly received in aligned annular grooves of the rod 6 and the disc 8 which are semicircular in cross section.

Figure 6:
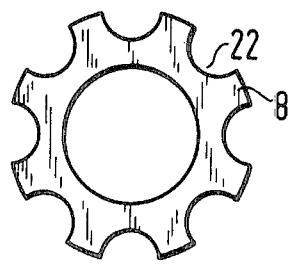
FIG. 6 illustrates a variant of the device of FIG. 5.

In the variant of the disc 8 illustrated in FIG. 6, the bores 18 are replaced by notches 22 in the circumference of the disc. Liquid flow through the notches is controlled by one or more resilient valve discs known in themselves and not illustrated.

The normal operation of the illustrated apparatus as a compensating or leveling hydropneumatic spring will be evident to those skilled in the art from the drawing and the preceding description so as not to require detailed description. Under minor load variations, the effective length of the shock absorber between the attached portions of its main elements, the piston rod 6 and cylinder 4, varies cyclically, and the gay cushion 34 expands and is compressed. The several one-way valves are arranged in such a manner that the cyclic movements of the principal shock absorber elements cause liquid 35 to be admitted into the cylinder 4 when the applied load exceeds a certain limit, and liquid to be pumped into the chamber 10 when the load decreases.

When the spacer member 8, during its upward movement in the cylinder 4, travels beyond the point 30, the flow section of the gap between the spacer member and the cylinder is suddenly reduced, and the piston rod 6 is braked as the piston 7 approaches the terminal position 7'.

Radial stresses A (FIG. 1) applied to the piston rod 6 when the nonillustrated wheel is steered or runs over an obstacle on the road, tend to flex the rod in the cavity of the cylinder 4 between the piston 7 and the end wall 15 so that the piston rod axis assumes the curved shape indicated in FIG. 2 by a broken line intersecting the straight line representing the cylinder axis at the piston 7 and the end wall 15.

The piston 7 is biased toward the position shown in FIG. 1. In this position, the spacer disc 8 is located where the piston axis would be bent farthest from the cylinder axis by radial stresses A in the absence of the disc. The disc 8, however, limits the free radial deflection of the piston rod to a value determined by the spacing of the face 20 from the wall of the cylinder 4 and by the rigidity of the latter so that the actual flexing of the piston rod axis is limited to the curved solid line in FIG. 2. The dimensions indicated by the several lines in FIG. 2 have been exaggerated or reduced for the convenience of pictorial representation.

While FIG. 2 gives a qualitative indication of the results achieved by the spacer disc 8, more detailed observations show the disc 8 to be instrumental in causing an increase in the resistance of the piston rod 6 to radial forces in several stages. In the first stage, illustrated in FIG. 7, the angle $\alpha$ between the piston rod axis and the cylinder axis at the seal in the end wall 15 increases without interference from the disc 8 until the disc abuts against the cylinder wall.

In the second stage, shown in FIG. 8, the rod 6 is flexed mainly in an arc between the radially fixed end wall 15 and the disc 8 which is similarly fixed by engagement with the cylinder wall. Ultimately, the piston rod axis is flexed sufficiently between the end wall 15 and the disc 8 to cause reverse flexing of the piston rod between the disc 8 and the piston 7, as shown in FIG. 9.

In the diagram of FIG. 10, the radial force A acting on the piston rod is plotted in linear, arbitrary units as the abscissa, and the angle $\alpha$ in corresponding units as the ordinate. When not affected by the spacer disc 8, the angle $\alpha$ increases linearly with increasing force A, as indicated by a straight line, partly fully drawn and partly broken, which reaches the level $\alpha_{max}$ at a relatively low value of A, $\alpha_{max}$ being the value of the angle $\alpha$ at which the piston rod 6 jams in the end wall 15.

In the presence of the spacer disc, the angle $\alpha$ increases fairly rapidly with the increasing force A through a range (1) until the disc abuts against the cylinder wall 4. The rate of increase in the angle $\alpha$ then is lower in a range (2) of the force A until reverse bending of the piston rod 16 occurs at the disc 8, as described above with reference to FIG. 9. Thereafter, the angle $\alpha$ increases even more slowly in a range (3) of the increasing transverse force A, and reaches a value $\alpha_{max}$ only at very much higher stresses than would be the case in the absence of the spacer disc.

The disc 8 similarly affects the frictional forces R which impede axial movement of the piston rod. As long as the angle $\alpha$ is small enough not to cause engagement of the disc 8 with the cylinder wall, the frictional resistance R increases only very slowly with increasing radial stress A. Thereafter, it increases more rapidly even in the presence of the disc 8, as indicated in FIG. 10 by a line of dashes and single dots. In the absence of the disc 8, friction would increase at a much higher rate with radial stress A applied to the rod 6, as indicated in FIG. 10 by a line of dashes and paired dots.

Radial pressure is transmitted from the cylinder 4 to the outer shell 5 by the spring 12 so that the shell backs the cylinder and increases its rigidity. The spring 12 is axially close to the normal position of the piston 7.

While the apparatus illustrated in FIG. 1 is preferred because of the simple manner in which it can be assembled, analogous results can be achieved with the modified apparatus illustrated in FIG. 3 only as far as necessary to point out the distinguishing features. It will be understood that the device of FIG. 3 is identical with that shown in FIG. 1 as far as not inconsistent with the following description.

A spacer disc 108 is fixedly mounted in the cavity of a cylinder 104 at two-thirds of the axial cylinder height between a lower end wall 111 and an upper end wall 115. A piston rod 106 axially passes through the end wall 115 and the spacer disc 108. It is sealed into the end wall, but passes the disc 108 with a clearance which is a fraction of a millimeter, typically 0.1 to 0.3 mm. A piston 107 on the inner end of the piston rod travels axially in the cylinder cavity between terminal positions determined by abutment of the piston, or of elements supported thereon against the end wall 111 and the disc 108 respectively.

The piston 107 is biased in normal operation of the shock absorber toward a position in which the disc 108 bisects the distance between the piston 107 and the end wall 115, and the piston 107 is axially closely adjacent a pressure transmitting annular disc 112 fixed in a compensating chamber 110 between the cylinder 104 and the outer shock absorber shell 105 and formed with axial passages 117.

What is claimed is:
1. A shock absorber comprising, in combination:
 a. a cylinder element enclosing a cavity and having an axis;
 b. a piston member axially movable in said cavity;
 c. abutment means limiting the axial movement of said piston member to a predetermined stroke between two terminal positions;
 d. a piston rod element fastened to said piston member and axially extending from the same through an end wall of said cylinder element; and
 e. spacer means for limiting radial deflection of said piston rod element in said cavity,
  2. said spacer means including a spacer member fixedly fastened to one of said elements in said cavity axially intermediate said piston member and said end wall and axially spaced from said end wall and said piston member when said piston member is in a normal position thereof, equidistant from said terminal positions,
  2. said spacer member having a face spacedly opposite the other element in the absence of said deflection,
  3. the spacing of said face from said other element being but a small fraction of the radial dimension of said piston rod element in said absence and decreasing in response to said radial deflection until said face abuttingly engages said other element.
2. A shock absorber as set forth in claim 1, wherein said spacer member is fastened to said one element in a position such that the spacer member approximately bisects the axial distance between said end wall and said piston member when said piston member is equidistant from said terminal positions thereof.
3. A shock absorber as set forth in claim 2, wherein said spacer member is annular about said axis, the shock absorber further comprising a fluid substantially filling said cavity, and means defining respective throttling passages for axial flow of said fluid past said piston member and past said spacer member, when said piston member is equidistant from said terminal positions thereof.
4. A shock absorber as set forth in claim 1, wherein said face is annular, and said face and said other element define therebetween a gap for axial flow of fluid past said spacer member, the cross section of said gap decreasing when said piston member approaches one of said terminal positions thereof.

5. A shock absorber as set forth in claim 4, said spacer member being fixedly fastened to said piston rod member, said cylinder element having a wall opposite said face and formed with an axial groove therein, said spacer member passing an axial end of said groove when said piston member approaches one of said terminal positions.

6. A shock absorber as set forth in claim 1, further comprising biasing means biasing said piston member toward said normal position thereof.

7. A shock absorber as set forth in claim 2, further comprising a tubular shell spacedly and substantially coaxially enveloping said cylinder element, and a pressure transmitting member radially interposed between said shell and said cylinder element in approximate radial alignment with said piston member when said piston member is in said normal position thereof.

8. A shock absorber as set forth in claim 1, further comprising a steering knuckle having an axis transverse to the axis of said cylinder element and fixedly fastened to the last-mentioned element.

9. A shock absorber as set forth in claim 8, further comprising a helical compression spring extending about said axis, respective axially terminal portions of said spring being fastened to said elements.

10. A shock absorber as set forth in claim 1, wherein the spacing of said face from said other element in said absence is approximately 0.1 to 0.3 mm.